United States Patent [19]

Buckland

[11] 3,722,624
[45] Mar. 27, 1973

[54] BEARING SEAL AND OIL TANK VENTILATION SYSTEM

[75] Inventor: Bruce O. Buckland, Schenectady, N.Y.

[73] Assignee: General Electric Company, Schenectady, N.Y.

[22] Filed: June 7, 1971

[21] Appl. No.: 150,378

[52] U.S. Cl. ............... 184/6.11, 60/39.08, 184/6.23, 277/15, 415/112
[51] Int. Cl. ............................................. F16n 39/00
[58] Field of Search ........... 60/39.08; 184/6.11, 6.23; 277/3, 15; 415/112

[56] References Cited

UNITED STATES PATENTS

| 3,527,054 | 9/1970 | Heinsworth | 60/39.66 |
| 3,574,478 | 4/1971 | Toth | 415/112 |
| 2,613,498 | 10/1952 | Prendergst | 60/39.08 |
| 1,728,268 | 9/1929 | Flanders | 277/15 X |
| 3,321,910 | 5/1967 | Davies et al. | 60/39.08 |
| 2,740,267 | 4/1956 | Bayard | 60/39.08 |
| 2,571,166 | 10/1951 | Rossetto | 184/6.11 |

FOREIGN PATENTS OR APPLICATIONS

| 658,044 | 10/1951 | Great Britain | 184/6.11 |

*Primary Examiner*—Manuel A. Antonakas
*Attorney*—William C. Crutcher, James W. Mitchell, Frank L. Neuhauser, Oscar B. Waddell and Joseph B. Forman

[57] ABSTRACT

High pressure leakage air into a bearing housing in a gas turbine drives an eductor pump which ventilates the oil tank and removes oil vapor from the other bearing housings while providing a seal.

9 Claims, 5 Drawing Figures

INVENTOR:
BRUCE O. BUCKLAND,
BY W. C. Crutcher
HIS ATTORNEY.

BEARING SEAL AND OIL TANK VENTILATION SYSTEM

BACKGROUND OF THE INVENTION

This invention relates generally to the bearing seals for rotating elastic fluid equipment and more particularly to an improved bearing seal and oil tank ventilating system for a gas turbine.

Rotating elastic fluid equipment, such as gas turbines, have several bearings spaced along the shaft, some located in regions of atmospheric pressure, and others located in regions of relatively high fluid pressure. A lubrication system is provided to pump oil to the bearings, recover it from a sump, cool it and recirculate it to the bearings. Shaft seals or packings are generally provided incorporating oil deflectors, labyrinth teeth and the like to prevent the oil vapor from leaving the bearing enclosure or escaping into the main working fluid passing through the machine.

Two general types of bearing seals have been used in gas turbines, vacuum type systems and pressure type systems. A pressure type system employs an intermediate chamber between the outside of the bearing enclosure and the drain enclosure leading to the sump. This intermediate chamber is pressurized so that the pressurizing fluid flows in both directions, i.e., both out of the bearing enclosure and into the sump. An example of such a system may be seen in U.S. Pat. No. 3,527,054 to Hemsworth, assigned to the present assignee, wherein the pressurization chamber is supplied by an eductor powered by compressor extraction air.

In a vacuum type bearing seal system, an intermediate pressure chamber is not employed, but rather oil vapor, together with air or other fluid is removed from a single chamber in the bearing enclosure by maintaining the chamber at a lower pressure than its surroundings.

Many economies are possible with a vacuum type system, because the cost of the packings and bearing housings are reduced. The air necessary to pressurize packings as well as attendant piping would not be required and less oil might be lost in the form of vapor. However, there have been offsetting disadvantages, such as the necessity for a pumping system to provide the vacuum, as well as problems caused by different ambient pressures around the bearing enclosures which makes it difficult to feed into a common vacuum system.

Accordingly, one object of the present invention is to provide an improved bearing seal and oil tank ventilation system of the vacuum sealing type for a gas turbine.

Another object of the invention is to provide an improved bearing sealing arrangement for an elastic fluid machine in which the bearing enclosures are exposed to different ambient pressures.

DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the accompanying drawings in which:

FIG. 1 is a simplified schematic drawing of a gas turbine bearing seal and ventilation arrangement using the preferred embodiment of the invention, FIGS. 2 and 3 are simplified schematic views of modified forms of separators and oil tank arrangements for the invention, FIG. 4 shows a reverse placement by separator and eductor, and FIG. 5 is a modified type of high pressure bearing housing.

SUMMARY OF THE INVENTION

Briefly stated, the invention is practiced by providing an oil tank under vacuum connected to the drain cavities of all the bearings that are exposed to atmospheric pressure. The vacuum is produced by an eductor or jet pump, the driving fluid for which is taken from the drain-space cavities of bearings which are exposed to pressures higher than atmospheric. The driving fluid flows from the high pressure spaces surrounding the bearing housings into the drain spaces of the high pressure bearings through the bearing seals and thus it is used also to seal the high pressure bearing housings against vapor leakage.

DESCRIPTION OF THE PREFERRED EMBODIMENT

Figure 1:
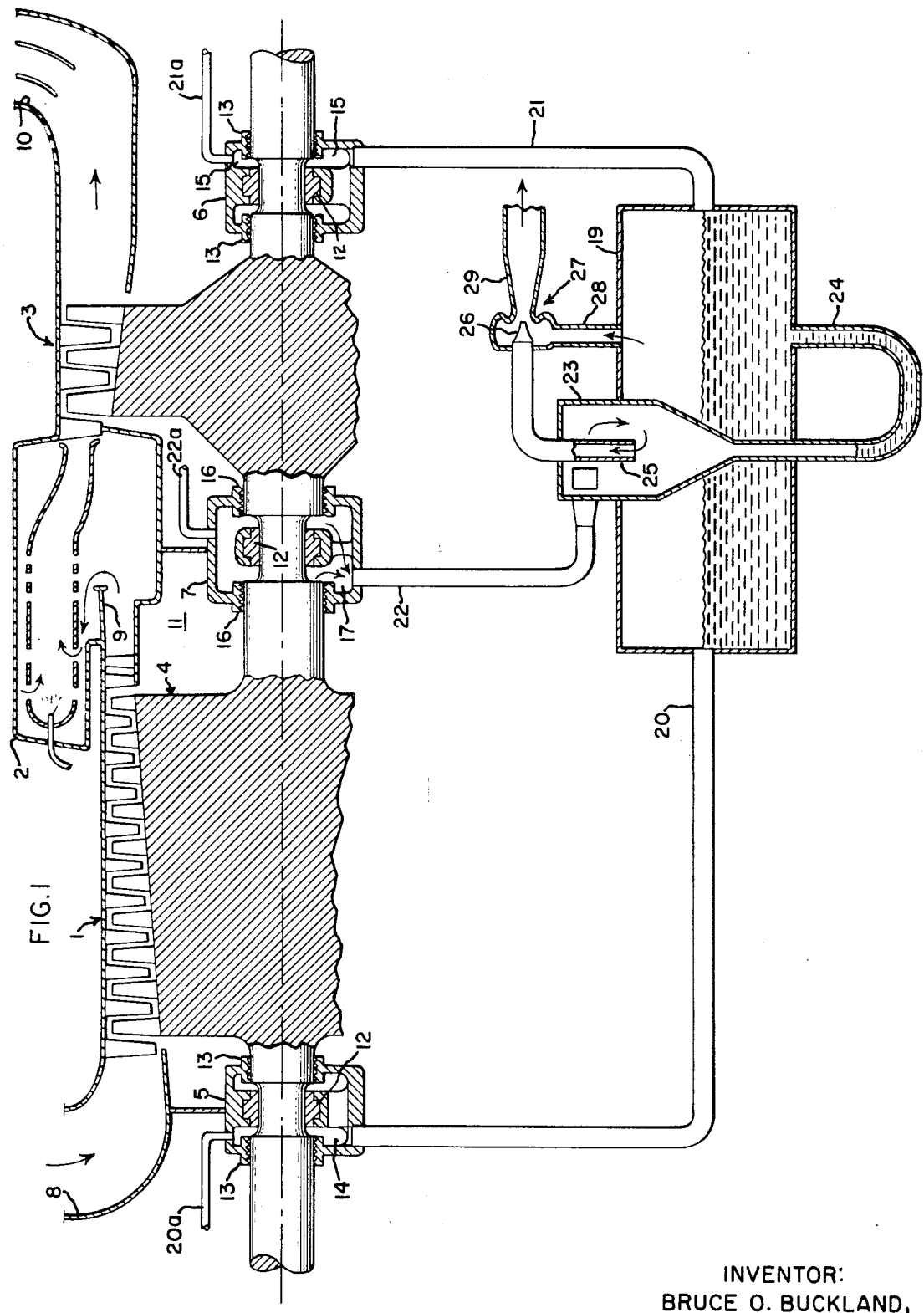

Referring now to FIG. 1 of the drawing, a simplified figure is shown of a gas turbine having a compressor 1, combustion chamber 2, and turbine 3. The gas turbine rotor shown at 4 is supported by two outside journal bearings, held in bearing housings 5 and 6. An intermediate journal bearing is contained in bearing housing 7. It will be understood by those skilled in the art that additional bearings may be employed along the gas turbine rotor, as well as bearings used to rotatably support the shaft of the load device such as a generator or compressor.

As will be known to those skilled in the art, air enters the gas turbine compressor inlet 8, is compressed to several atmospheres by the time it reaches the compressor outlet 9, fuel is burned and the products of combustion exhaust to the atmosphere at the exhaust 10. The details of the gas turbine cycle are immaterial to the present invention, except to note that the intermediate bearing housing 7 is exposed to relatively high ambient pressure in a chamber 11, which pressure is determined by the pressure at the root of the first stage turbine bucket and the required cooling air flow to this point. Bearing housings 5 and 6, however, are exposed to normal atmospheric pressure.

Each of the bearing housings 5 and 6 include journal bearing shoes 12, supplied with lubricating oil by a conventional lubrication system (not shown). Labyrinth seals 13 cooperating with the shaft on either side of the journal bearing 12, seal off the bearing housings from their surroundings and enclose drain chambers 14, 15 within housings 5 and 6 respectively. Similarly, the seal for bearing housing 7, henceforth known as the high pressure housing, is formed by means of labyrinth teeth 16 on either side of the journal bearing, providing a drain chamber 17 inside the high pressure housing.

Lubricating liquid for the gas turbine journal bearings is taken from a separate system and is drained into a sealed oil tank 19 which is held under vacuum of about 5 or 10 inches of water in a manner to be described. Lubricating oil, oil vapor and seal leakage fluid from bearings 5, 6 flow via drain lines 20 and 21 respectively to the oil tank 19.

A drain line 22 from the high pressure bearing housing 7 leads to a whirl or vortex type separator 23 disposed in the top of oil tank 19. The lubricating fluid, and oil vapor and the seal leakage flow through line 22 to the separator 23. The liquid drain from the separator is connected to the bottom of the oil tank by means of a liquid sealing loop 24.

A gas outlet pipe 25 of separator 23 is connected to the driving nozzle 26 in an eductor device or jet pump shown generally at 27. The suction inlet of the jet pump is connected to the top of tank 19 through a pipe 28, and the pumped mixture is discharged through a diffuser 29 to the atmosphere, thereby also drawing a vacuum in the top of oil tank 19.

In cases where the drains 20, 21, 22 from the bearing housings 5, 6, 7 respectively are required to run full of drainage oil, either temporarily or continuously, vent lines 20a, 21a, 22a can be supplied to convey vapor and seal leakage fluid. Use of these vent lines will be elaborated upon in connection with modified forms of the invention.

OPERATION

The operation of the device shown in FIG. 1 is as follows. Due to the high pressure in chamber 11 surrounding the high pressure bearing housing 7, air or other gas turbine fluid at high pressure will leak past the labyrinth seals 16 into drain chamber 17 in the bearing housing 7. From this point the seal leakage flows with the lubricating oil through the bearing drain 22 to the separator 23. The liquid portion separated from this stream by separator 23 flows to the oil tank 19 through the pressure sealing leg 24. The gaseous portion of the stream exits through inlet pipe 25. The high pressure gaseous portion is discharged through the jet pump driving nozzle 26, drawing with it air and oil vapor from the top of tank 19 through pipe 28 leading to the inlet of jet pump 27.

Since the interior of the separator 23 is at higher pressure than the air in the top of tank 19, a seal is accomplished by means of the liquid loop 24 which allows oil to drain into the tank. The vacuum in the top of tank 19 will serve to maintain a reduced pressure in bearing housings 5, 6 and to pull atmospheric air through labyrinths 13 and thus to seal the bearing housings. The mixture of vapor from the bearings and the seal leakage air from the atmosphere is drawn into tank 19. The air that would otherwise be wasted by leaking into the high pressure bearing 7 is therefore used to provide a vacuum pumping system by using a jet pump as indicated.

MODIFICATIONS

Figure 2:
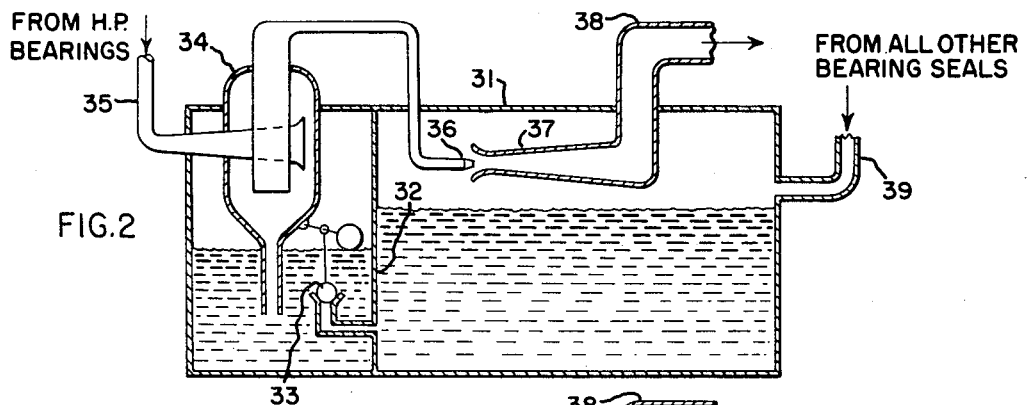

FIG. 2 is similar to FIG. 1, except that an oil tank 31 is divided into two portions by a partition 32, and a float controlled valve 33 provides liquid communication between the two sides of the tank while maintaining a pressure difference therebetween. A whirl type separator 34 is supplied with a high pressure mixture from the high pressure bearing through pipe 35. This may connect with an oil drain line such as 22 or a vent line 22a or in some cases to both types of drains (see FIG. 1). The eductor nozzle 36 and the diffuser 37 are positioned inside tank 31 with a discharge pipe 38 leading to the atmosphere. The diffuser arrangement is equivalent to that shown in FIG. 1 except that the components are inside the tank. The eductor primary inlet communicates with the chamber 17 of the high pressure bearing housing 7, with the separator 34 interposed.

An inlet line 39, conducts drainage oil and vapor evacuated from the remaining bearings to the vacuum side of tank 31 as indicated. The drain lines 20, 21 of FIG. 1 are usually connected to the oil tank through a line like 39 which enters at the oil level. The special vent lines 20a, 21a are connected to the tank through lines entering the tank well above the oil level. The drain chambers of the remaining bearing housings therefore communicate with the secondary eductor inlet which is in the top of tank 31.

Figure 3:
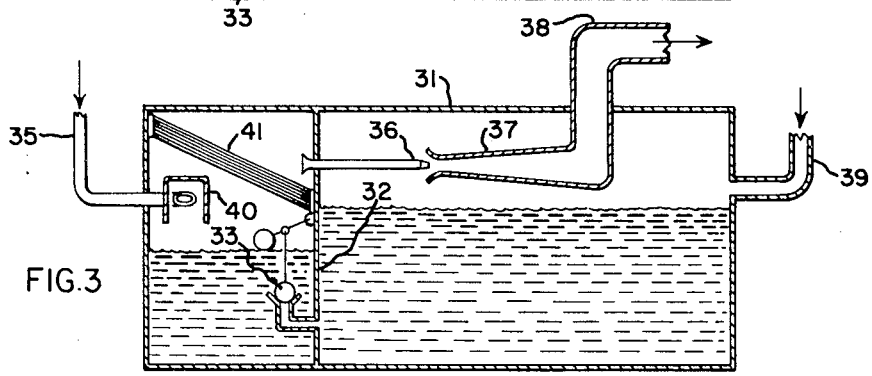

FIG. 3 is a modification which is identical to FIG. 2, except that a different type of separating device is employed. The high pressure fluid mixture is first separated roughly by introducing it tangentially into a cylinder 40 closed at one end and directed downward. Final separation is then accomplished by leading the resulting mixture through a separator 41 having a large surface area and that can be readily installed in the upper portion of the high pressure section of the oil tank 31. This final separator can be a wire mesh type, sometimes called a "demister," is probably because this type is usually best for separating small liquid drops from a gaseous medium. However a vane type separator could also be used. The arrangement of FIG. 3 is one of the simplest ways of carrying out this invention.

The operation of FIGS. 2 and 3 is the same as previously described in connection with FIG. 1, except that instead of using a liquid loop to provide a seal to maintain the pressure difference between the two portions of the oil tank, the float valve 33 performs this function. The addition of oil to the high pressure side of the tank 31 opens the float valve and allows oil to run into the low pressure side. Valve 33 thus regulates the liquid level in the high pressure portion of tank 31.

In all of the preceding FIGS. 1, 2 and 3, the oil and oil vapor separator is located between the jet pump and the high pressure bearing housing, so that the high pressure vapor flows through the separator to power the jet pump nozzle. In some cases it may be desirable to locate the separator on the outlet side of the jet pump and this can be done without departing from the concept of the present invention.

Figure 4:
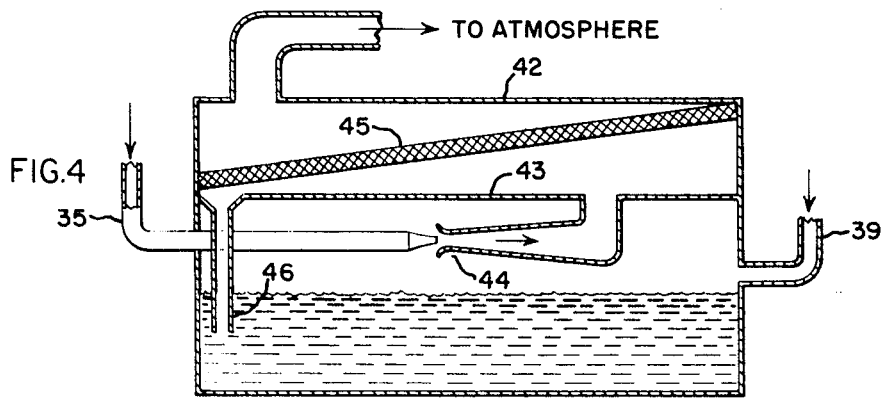

FIG. 4 shows such an arrangement, where an oil tank 42 is divided by a horizontal partition 43 into a "pressure" side on the top and a "vacuum" side on the bottom. Drain lines 39 feed the vacuum side, while high pressure inlet line 35 is connected to a jet pump 44 inside the vacuum chamber. A "demister" separator element 45 is disposed in the pressure chamber of the tank and supplied from the outlet of jet pump 44. A liquid leg 46 from the pressure side of tank 42 allows separated fluid to flow into the vacuum side while maintaining a seal. In any of the arrangements like that in FIG. 4, float valves could be used as shown in FIGS. 2 and 3 to regulate the flow of oil from the separator, or the separator portion of the oil tank, to the portion of the oil tank under vacuum. However, since in these cases where the jet pump is ahead of the separating means, and the pressure difference between the separating chamber and the oil tank is always low, the preferred regulating means is a loop or leg seal, as shown at 46 in FIG. 4.

Figure 5:
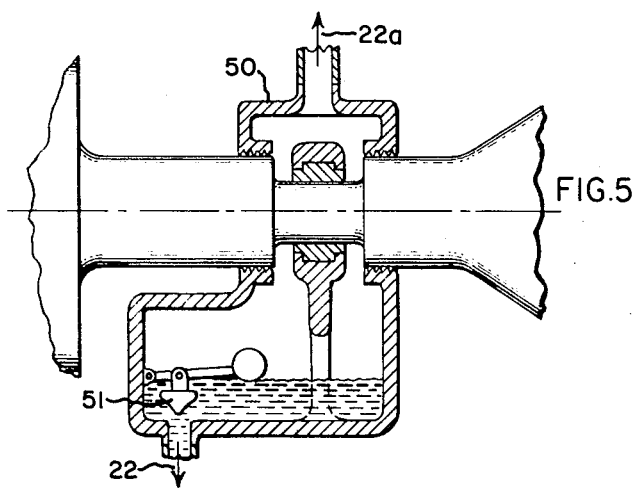

FIG. 5 shows a modified type of high pressure bearing housing 50 where the vent line 22a and the drain line 22 are isolated from one another by a liquid seal controlled by a float valve 51. Thus the vent line 22a can be connected to line 35 of FIGS. 2, 3 and 4, while the high pressure drain line 22 can be connected into the drain lines 39 of FIGS. 2, 3 and 4. The separated vent bearing housing 51 is preferable when using the FIG. 4 separator arrangement, because most of the lubricating oil is separated from the sealing vapor in the high pressure bearing housing 51 and need not pass through the jet pump.

Thus there has been disclosed an improved bearing seal system of the vacuum type wherein fluid entering the high pressure seal which would otherwise be wasted is used to provide the pumping action to produce the vacuum. Simplifications of the bearing packings and the overall piping system are accomplished with the foregoing invention. The invention is not confined to gas turbines but applies generally to rotating fluid machines. For example, a steam turbine bearing could employ high pressure steam to power an eductor so as to evacuate chambers disposed in bearings in lower pressure regions of the steam turbine.

While there has been shown what is considered to be the preferred embodiment of the invention, it is understood that various modifications may be made therein, and it is intended to cover in the appended claims all such modifications as fall within the true spirit and scope of the invention.

What is claimed as new and desire to secure by Letters Patent of the United States:

1. In an elastic fluid turbo machine having a shaft held in a plurality of bearings with means to lubricate said bearings, the improvement comprising:
    first and second bearings, each of said bearings having journal bearing means held in a housing enclosing a portion of said shaft, said first bearing housing being disposed in a region of high pressure elastic fluid,
    eductor means having a primary nozzle inlet, a secondary fluid inlet, and an outlet,
    first conduit means providing communication between the bearing housing of said first high pressure bearing and said primary nozzle inlet for conducting said high pressure elastic fluid to said inlet, and
    second conduit means providing communication between the bearing housing of said second bearing and the eductor secondary fluid inlet.

2. The combination according to claim 1 wherein there is interposed in said first conduit means a liquid separator for removing a liquid portion of the fluid leading to said nozzle.

3. The combination according to claim 1, including a tank adapted to contain liquid lubricant in the lower portion thereof and wherein said second conduit means includes a vapor space in the upper portion of said tank.

4. The combination according to claim 1, and further including a tank in communication with said second conduit means to receive a liquid portion of the fluid passing through said second conduit means, and also including a separator interposed in said first conduit means to remove the liquid portion of the fluid passing through said first conduit means, said separator and said tank being interconnected in the liquid receiving portions thereof.

5. The combination according to claim 4, wherein said separator and said tank are connected by a sealing loop conduit of sufficient length to maintain the pressure differential between said first and second conduit means.

6. The combination according to claim 4, wherein the liquid receiving portions of the separator and tank are interconnected by a float-controlled valve.

7. The combination according the claim 1, wherein there is interposed between the eductor outlet and the atmosphere means for separating the liquid portion of the fluid leaving the eductor, and a tank receiving a liquid portion of the fluid passing through said second conduit means, said separator and said tank liquid receiving portions being interconnected with means to maintain the pressure differential therebetween.

8. The combination according to claim 1 wherein said first bearing housing has a vent connected to said first conduit means and a drain outlet connected to said second conduit means, together with float valve means to control liquid flow from said drain outlet, while maintaining pressure in the first bearing housing.

9. A gas turbine bearing seal and oil tank ventilating system comprising:
    a gas turbine having a rotor supported on a plurality of bearings in bearing housings with means to lubricate said bearings, one of said bearing housings being disposed in a high pressure interior region of the gas turbine,
    an oil tank conduit means connecting said bearing housings to said oil tank to drain oil and vapor from the gas turbine bearing housings and collect the liquid portion thereof in the oil tank,
    a separator connected with conduit means to receive high pressure elastic fluid and vapor from said high pressure bearing housing and to separate the liquid portion therefrom and return it to said oil tank, means for maintaining a pressure differential between said oil tank and said separator,
    an eductor having a primary nozzle inlet connected to receive the gaseous portion of the fluid from said separator, said eductor also having secondary inlet connected to the upper part of said oil tank, and discharging to the atmosphere,
    whereby fluid leaking into the high pressure bearing housing serves to pump a vacuum on the oil tank and seal the remainder of the bearing housings in the gas turbine.

* * * * *